(12) United States Patent
Wells et al.

(10) Patent No.: US 10,275,696 B2
(45) Date of Patent: Apr. 30, 2019

(54) INFORMATION ENCODING METHODS, INFORMATION DECODING METHODS, COMPUTER-READABLE MEDIA, INFORMATION ENCODERS, AND INFORMATION DECODERS

(71) Applicant: RAZER (ASIA-PACIFIC) PTE. LTD., Singapore (SG)

(72) Inventors: Stuart Wells, San Francisco, CA (US); Anthony P. Casano, Felton, CA (US)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 15/764,978

(22) PCT Filed: Sep. 30, 2015

(86) PCT No.: PCT/SG2015/050354
§ 371 (c)(1),
(2) Date: Mar. 30, 2018

(87) PCT Pub. No.: WO2017/058100
PCT Pub. Date: Apr. 6, 2017

(65) Prior Publication Data
US 2018/0276513 A1    Sep. 27, 2018

(51) Int. Cl.
*G06K 19/06* (2006.01)
*G06F 3/02* (2006.01)
(Continued)

(52) U.S. Cl.
CPC ....... *G06K 19/06028* (2013.01); *G06F 3/023* (2013.01); *G06F 3/0227* (2013.01);
(Continued)

(58) Field of Classification Search
CPC ......... G06T 1/005; G06T 9/00; G06T 1/0028; G06T 1/0085; G06K 19/06037;
(Continued)

(56) References Cited

U.S. PATENT DOCUMENTS 5,314,337 A    5/1994  Dixon
5,691,709 A *  11/1997  Guntin ................. H04L 1/1887
                                                           340/7.22
(Continued)

FOREIGN PATENT DOCUMENTS

EP        2312809 A1       4/2011
KR    10-2014-0040097      4/2014
WO    WO 2009/029047       3/2009

OTHER PUBLICATIONS

International Search Report and Written Opinion, dated Jul. 25, 2016, for the corresponding International Application No. PCT/SG2015/050354 in 12 pages.
(Continued)

*Primary Examiner* — Thien T Mai
(74) *Attorney, Agent, or Firm* — Polsinelli PC

(57) ABSTRACT

According to various embodiments, an information encoding method may be provided. The information encoding method may include: receiving information to be encoded; splitting the information into a plurality of subsets; assigning each subset to a frame, so as to determine a plurality of frames; for each subset assigning the subset to a plurality of colors; and sequentially, for each frame of the plurality of frames, displaying the colors assigned for the respective frame and an indicator for the frame on an array of picture elements.

16 Claims, 7 Drawing Sheets

(51) Int. Cl.
*G06F 3/023* (2006.01)
*G06Q 30/02* (2012.01)

(52) U.S. Cl.
CPC ... *G06K 19/0614* (2013.01); *G06K 19/06037* (2013.01); *G06K 19/06112* (2013.01); *G06Q 30/0207* (2013.01); *G06K 2019/06225* (2013.01)

(58) Field of Classification Search
CPC .......... G06K 7/10; G06K 7/1095; G06K 7/14; G06K 17/0022; G06K 19/06046; G06K 2209/01; G06K 19/14; G06K 19/06187; G06K 19/06196; G06K 19/07; G06K 19/077; G06K 19/06009; G06K 19/06103; G06K 19/06028; G06K 19/06075; G06K 19/06093; G06K 19/0614; G06Q 20/32; G06Q 20/322; G06Q 20/3274; G06Q 20/343; G06Q 30/0269; G06Q 30/0241; G07F 7/02; G07G 1/0045; G06F 3/0482; G06F 3/0485; G06F 3/011; G06F 3/012; G06F 3/0304; G06F 3/0481; G06F 3/04847; G06F 3/04883; G06F 3/04886; G06F 3/002; G06F 3/023; G06F 3/0236; G06F 3/0237
See application file for complete search history.

(56) References Cited

U.S. PATENT DOCUMENTS

| | | | |
|---|---|---|---|
| 6,850,225 B1 | 2/2005 | Whitcroft | |
| 6,943,776 B2 | 9/2005 | Ehrenburg | |
| 7,180,022 B1 | 2/2007 | Chiu | |
| 7,318,019 B1 | 1/2008 | Baker et al. | |
| 7,712,920 B1 | 5/2010 | Hsieh | |
| 7,739,615 B2 | 6/2010 | Pearson | |
| 8,384,676 B2 | 2/2013 | Kondo | |
| 8,500,015 B2 | 8/2013 | Grant et al. | |
| 8,537,132 B2 | 9/2013 | Ng et al. | |
| 9,111,186 B2 | 8/2015 | Blasinski et al. | |
| 2003/0034878 A1 | 2/2003 | Hull et al. | |
| 2005/0114825 A1 | 5/2005 | Leung et al. | |
| 2008/0035734 A1* | 2/2008 | Challa | G06K 7/10 235/462.46 |
| 2008/0112489 A1 | 5/2008 | Malladi et al. | |
| 2009/0128492 A1 | 5/2009 | Yoo et al. | |
| 2010/0246984 A1* | 9/2010 | Cheong | G06K 19/06037 382/233 |
| 2010/0302162 A1 | 12/2010 | Jo | |
| 2011/0080519 A1 | 4/2011 | Chowdhry et al. | |
| 2012/0008684 A1 | 1/2012 | Lee et al. | |
| 2014/0028565 A1 | 1/2014 | Gueorguiev | |
| 2014/0076703 A1 | 3/2014 | Chao | |
| 2014/0157161 A1 | 6/2014 | Hunt et al. | |
| 2014/0263668 A1 | 9/2014 | Mesh-Iliescu et al. | |
| 2015/0026074 A1 | 1/2015 | Cotton | |

OTHER PUBLICATIONS

High Capacity Color Barcodes (HCCB) established Dec. 18, 2007 by Gavin Jancke, director of engineering for Microsoft Research and inventor of the High Capacity Color Barcode format, http://research.microsoft.com/en-us/projects/hccb/about.aspx.
Extended European Search Report dated Aug. 14, 2018, 11 pages, for the corresponding European Patent Application No. 15905528.4.

* cited by examiner

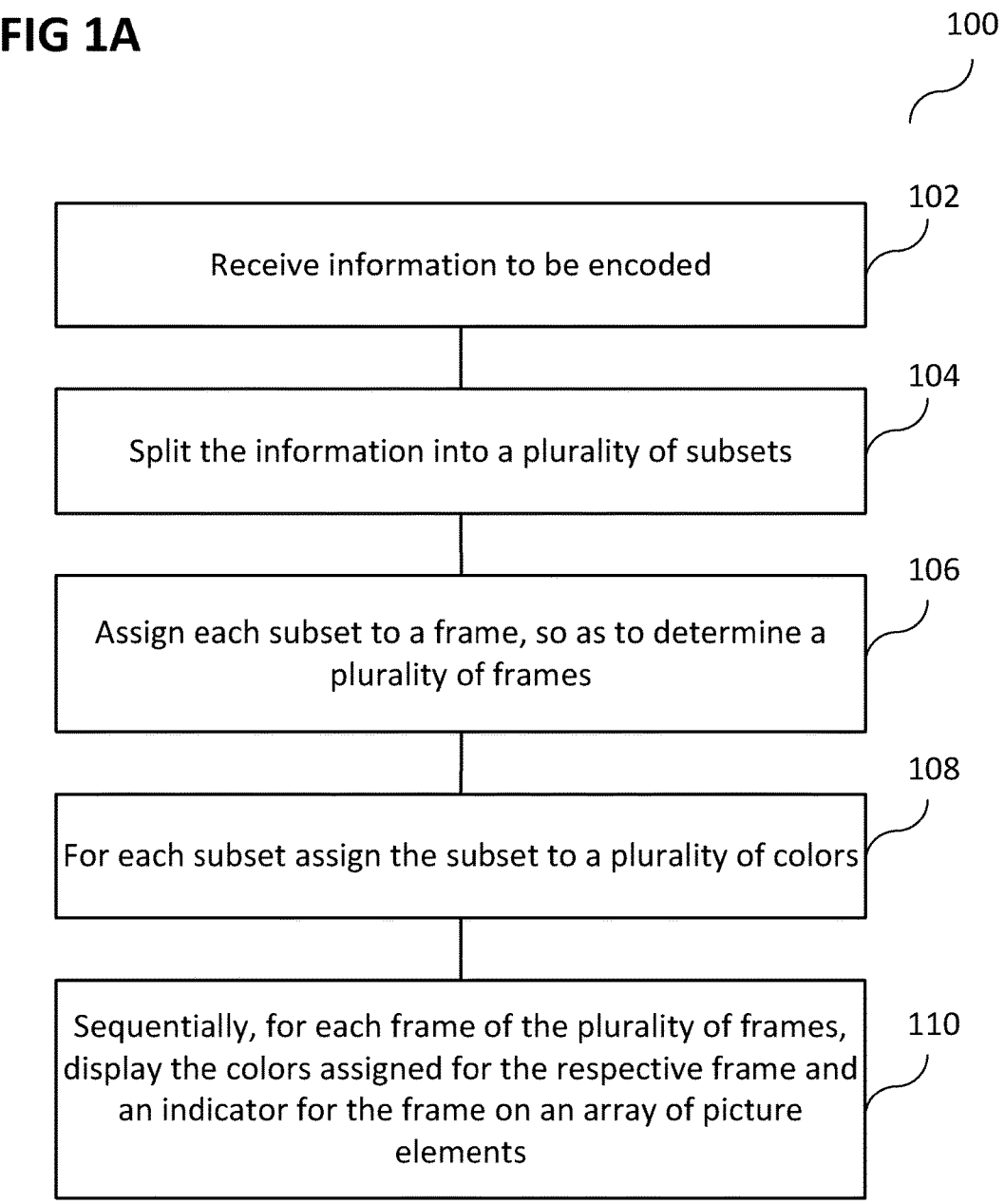

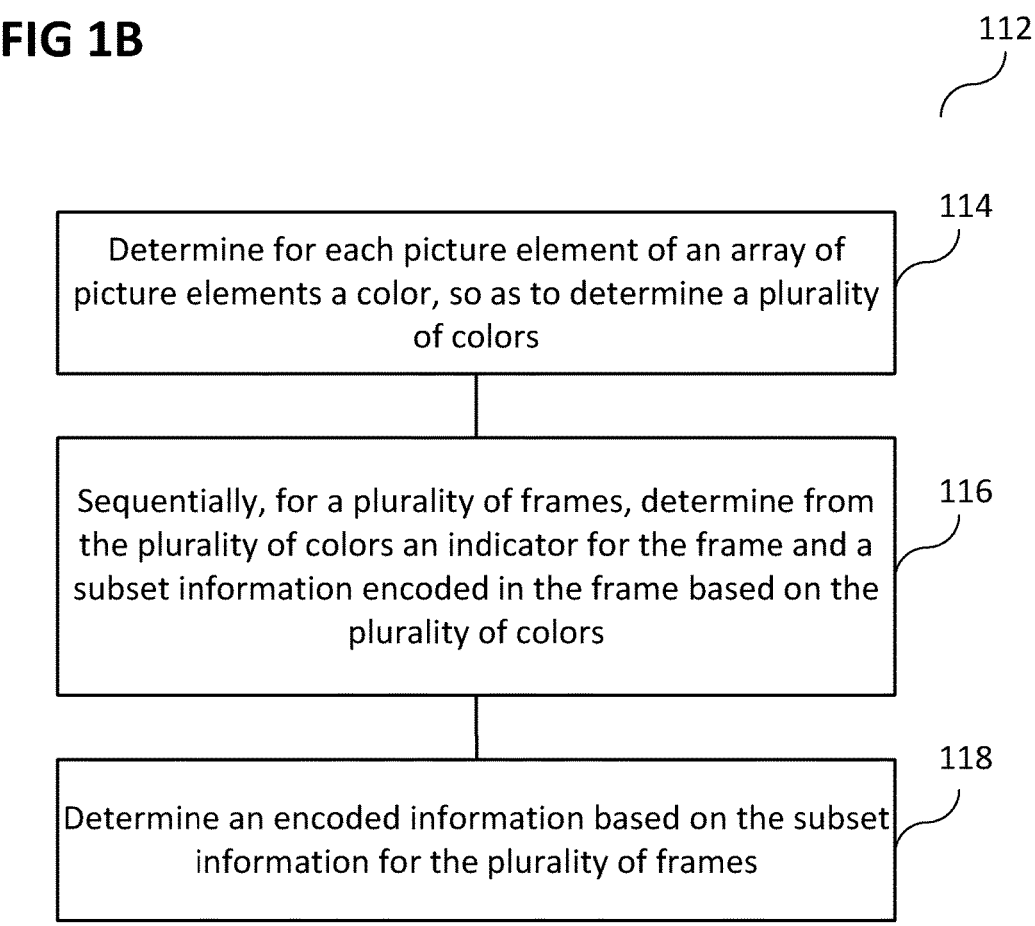

INFORMATION ENCODING METHODS, INFORMATION DECODING METHODS, COMPUTER-READABLE MEDIA, INFORMATION ENCODERS, AND INFORMATION DECODERS

TECHNICAL FIELD

Various embodiments generally relate to information encoding methods, information decoding methods, computer-readable media, information encoders, and information decoders.

BACKGROUND

In customer relationships, it may be desired to provide customers with some sort of coupon or award or registration.

SUMMARY OF THE INVENTION

According to various embodiments, an information encoding method may be provided. The information encoding method may include: receiving information to be encoded; splitting the information into a plurality of subsets; assigning each subset to a frame, so as to determine a plurality of frames; for each subset assigning the subset to a plurality of colors; and sequentially, for each frame of the plurality of frames, displaying the colors assigned for the respective frame and an indicator for the frame on an array of picture elements.

According to various embodiments, an information decoding method may be provided. The information decoding method may include: determining for each picture element of an array of picture elements a color, so as to determine a plurality of colors; sequentially, for a plurality of frames, determining from the plurality of colors an indicator for the frame and a subset information encoded in the frame based on the plurality of colors; and determining an encoded information based on the subset information for the plurality of frames.

According to various embodiments, computer-readable medium may be provided. The computer-readable medium may include instructions which, when executed by a computer, make the computer perform an information encoding method. The information encoding method may include: receiving information to be encoded; splitting the information into a plurality of subsets; assigning each subset to a frame, so as to determine a plurality of frames; for each subset assigning the subset to a plurality of colors; and sequentially, for each frame of the plurality of frames, displaying the colors assigned for the respective frame and an indicator for the frame on an array of picture elements.

According to various embodiments, a computer-readable medium may be provided. The computer-readable medium may include instructions which, when executed by a computer, make the computer perform an information decoding method. The information decoding method may include: determining for each picture element of an array of picture elements a color, so as to determine a plurality of colors; sequentially, for a plurality of frames, determining from the plurality of colors an indicator for the frame and a subset information encoded in the frame based on the plurality of colors; and determining an encoded information based on the subset information for the plurality of frames.

According to various embodiments, an information encoder may be provided. The information encoder may include: a receiver configured to receive information to be encoded; a splitting circuit configured to split the information into a plurality of subsets; a first assigning circuit configured to assign each subset to a frame, so as to determine a plurality of frames; a second assigning circuit configured to, for each subset, assign the subset to a plurality of colors; and a display circuit configured to, sequentially, for each frame of the plurality of frames, display the colors assigned for the respective frame and an indicator for the frame on an array of picture elements.

According to various embodiments, an information decoder may be provided. The information decoder may include: a first determination circuit configured to determine for each picture element of an array of picture elements a color, so as to determine a plurality of colors; a second determination circuit configured to determine sequentially, for a plurality of frames, from the plurality of colors an indicator for the frame and a subset information encoded in the frame based on the plurality of colors; and a third determination circuit configured to determine an encoded information based on the subset information for the plurality of frames.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 1A shows a flow diagram illustrating an information encoding method according to various embodiments;

FIG. 1B shows a flow diagram illustrating an information decoding method according to various embodiments;

DETAILED DESCRIPTION

Figure 1C:
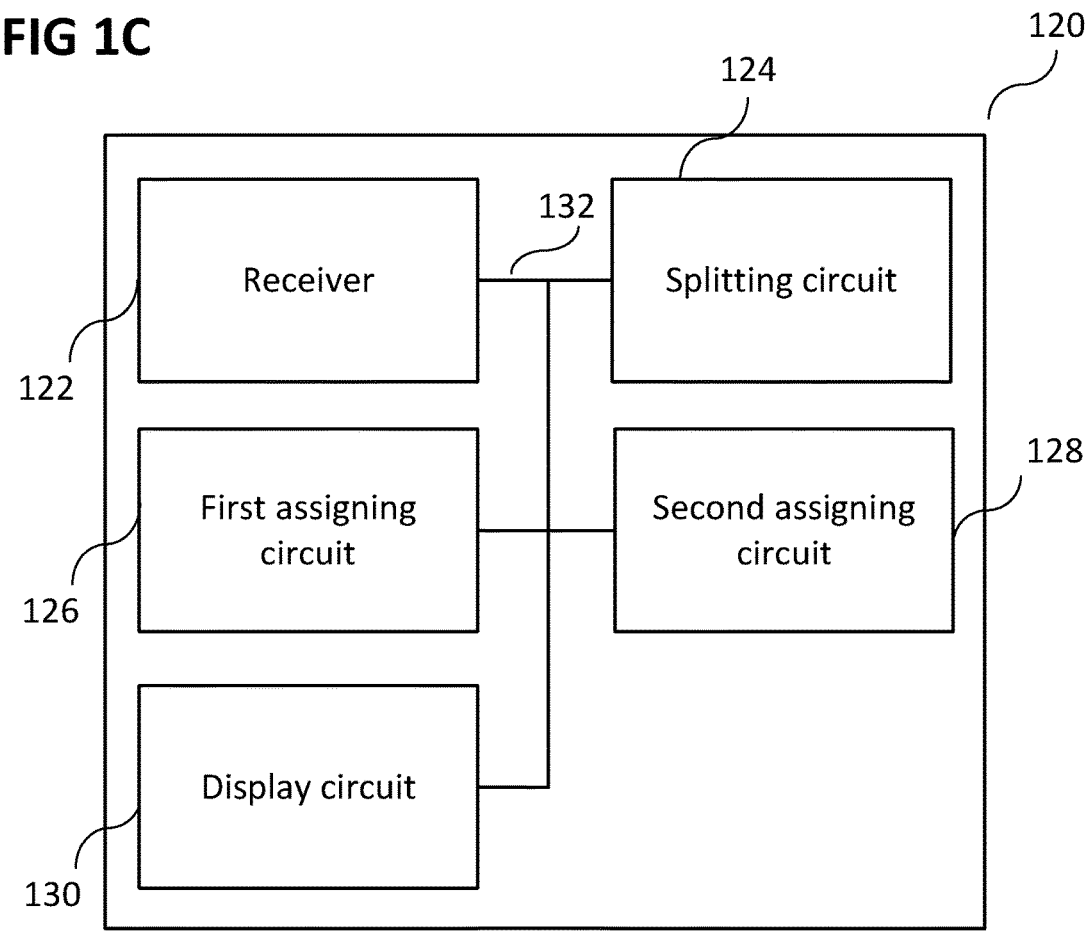
FIG. 1C shows an information encoder according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the information encoder as described in this description may include a memory which is for example used in the processing carried out in the information encoder. In this context, the information decoder as described in this description may include a memory which is for example used in the processing carried out in the information decoder. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

According to various embodiments, information may be embedded in the background LED (light emitting diode) or LEDs used by keyboards to represent a unique identifier. This unique identifier may be read using a custom application to read the light levels in an image captured by a digital camera.

According to various embodiments, a unique ID (identifier) for a keyboard (for example a Chroma keyboard) and some code in an application may be displayed, so that a customer may be provided with some sort of coupon or award or registration. In marketing this may be a winner, since it may require the customer to actually have bought and connected the keyboard to a USB (universal serial bus) device, and have downloaded the application for the award.

According to various embodiments, data may be embedded in LEDs of a keyboard; in other words: embedded data may be represented in a background keyboard LED.

According to various embodiments, Chroma octal encoding may be provided.

According to various embodiments, for companies which sell hardware and software (for example for Razer), it may be interesting to get a customer interested in installing a software of the company once the customer bought hardware of the company. The software package may be a camera app that reads a unique identifier from the keyboard or laptop to register the new product, issue a loyalty discount, and gather more information from customers or even show adds for other products they may wish to purchase on the app.

Taking the information optically from the installed keyboard or running laptop shows that it has been unpackaged and is currently being used by the customer. It allows the company to add a burden to actually use a product when registering the device.

FIG. 1A shows a flow diagram 100 illustrating an information encoding method according to various embodiments. In 102, information to be encoded may be received. For example, the information may include a plurality of bits. In 104, the information may be split into a plurality of subsets (for example including a subset of the plurality of bits). In 106, each subset may be assigned to a frame, so as to determine a plurality of frames. In 108, for each subset, the subset may be assigned to a plurality of colors. In 110, sequentially, for each frame of the plurality of frames, the colors assigned for the respective frame and an indicator for the frame may be displayed on an array of picture elements.

In other words, according to various embodiments, information may be encoded in a plurality of frames, which may be displayed sequentially. Each frame may be identified by an identifier.

According to various embodiments, the array of picture elements may include or may be backlit keys of a keyboard. According to various embodiments, the picture elements may be pixels on a display, for example a computer monitor or a laptop monitor, or a cinema screen, or an advertisement screen.

According to various embodiments, each picture element may encode a predetermined number of bits by a color of the picture element.

According to various embodiments, the information may correspond to at least one of a coupon, an award or registration information.

According to various embodiments, the indicator of each frame may be based on picture elements at predetermined positions of the array.

FIG. 1B shows a flow diagram 112 illustrating an information decoding method according to various embodiments. In 114, for each picture element of an array of picture elements a color may be determined, so as to determine a plurality of colors. In 116, sequentially, for a plurality of frames, from the plurality of colors an indicator for the frame and a subset information encoded in the frame may be determined based on the plurality of colors. In 118, an encoded information may be determined based on the subset information for the plurality of frames.

According to various embodiments, the array of picture elements may include or may be backlit keys of a keyboard. According to various embodiments, the picture elements may be pixels on a display, for example a computer monitor or a laptop monitor, or a cinema screen, or an advertisement screen.

According to various embodiments, each picture element may encode a predetermined number of bits by a color of the picture element.

According to various embodiments, the information may correspond to at least one of a coupon, an award or registration information.

According to various embodiments, the indicator of each frame may be based on picture elements at predetermined positions of the array.

According to various embodiments, a computer-readable medium may be provided, which may include instructions which, when executed by a computer, make the computer perform an information encoding method. The information encoding method may include: receiving information to be encoded; splitting the information into a plurality of subsets; assigning each subset to a frame, so as to determine a plurality of frames; for each subset assigning the subset to a plurality of colors; and sequentially, for each frame of the plurality of frames, displaying the colors assigned for the respective frame and an indicator for the frame on an array of picture elements.

According to various embodiments, the array of picture elements may include or may be backlit keys of a keyboard. According to various embodiments, the picture elements may be pixels on a display, for example a computer monitor or a laptop monitor, or a cinema screen, or an advertisement screen.

According to various embodiments, each picture element may encode a predetermined number of bits by a color of the picture element.

According to various embodiments, the information may correspond to at least one of a coupon, an award or registration information.

According to various embodiments, the indicator of each frame may be based on picture elements at predetermined positions of the array.

According to various embodiments, a computer-readable medium may be provided, which may include instructions which, when executed by a computer, make the computer perform an information decoding method. The information decoding method may include: determining for each picture element of an array of picture elements a color, so as to determine a plurality of colors; sequentially, for a plurality of frames, determining from the plurality of colors an indicator for the frame and a subset information encoded in the frame based on the plurality of colors; and determining an encoded information based on the subset information for the plurality of frames.

According to various embodiments, the array of picture elements may include or may be backlit keys of a keyboard. According to various embodiments, the picture elements may be pixels on a display, for example a computer monitor or a laptop monitor, or a cinema screen, or an advertisement screen.

According to various embodiments, each picture element may encode a predetermined number of bits by a color of the picture element.

According to various embodiments, the information may correspond to at least one of a coupon, an award or registration information.

According to various embodiments, the indicator of each frame may be based on picture elements at predetermined positions of the array.

FIG. 1C shows an information encoder 120 according to various embodiments. The information encoder 120 may include a receiver 122 configured to receive information to be encoded. The information encoder 120 may further include a splitting circuit 124 configured to split the information into a plurality of subsets. The information encoder 120 may further include a first assigning circuit 126 configured to assign each subset to a frame, so as to determine a plurality of frames. The information encoder 120 may further include a second assigning circuit 128 configured to, for each subset, assign the subset to a plurality of colors. The information encoder 120 may further include a display circuit 130 configured to, sequentially, for each frame of the plurality of frames, display the colors assigned for the respective frame and an indicator for the frame on an array of picture elements. The receiver 122, the splitting circuit 124, the first assigning circuit 126, the second assigning circuit 128, and the display circuit 130 may be coupled with each other, like indicated by lines 132, for example electrically coupled, for example using a line or a cable, and/or mechanically coupled.

According to various embodiments, the array of picture elements may include or may be backlit keys of a keyboard. According to various embodiments, the picture elements may be pixels on a display, for example a computer monitor or a laptop monitor, or a cinema screen, or an advertisement screen.

According to various embodiments, each picture element may encode a predetermined number of bits by a color of the picture element.

According to various embodiments, the information may correspond to at least one of a coupon, an award or registration information.

According to various embodiments, the indicator of each frame may be based on picture elements at predetermined positions of the array.

Figure 1D:
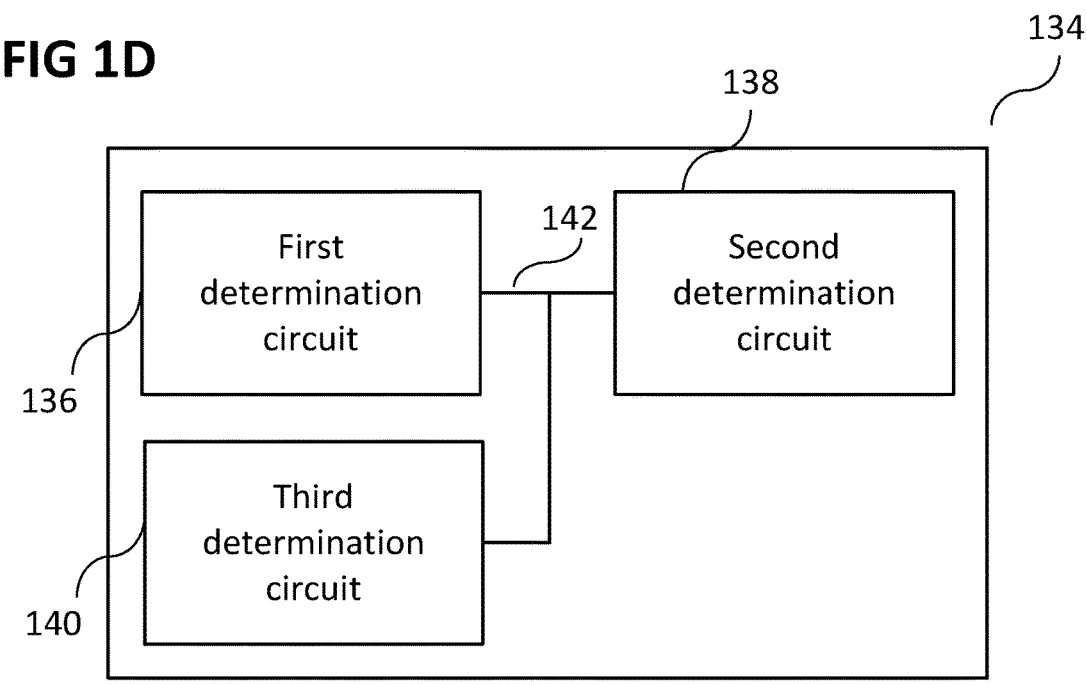
FIG. 1D shows an information decoder according to various embodiments.

FIG. 1D shows an information decoder 134 according to various embodiments. The information decoder 134 may include a first determination circuit 136 configured to determine for each picture element of an array of picture elements a color, so as to determine a plurality of colors. The information decoder 134 may further include a second determination circuit 138 configured to determine sequentially, for a plurality of frames, from the plurality of colors an indicator for the frame and a subset information encoded in the frame based on the plurality of colors. The information decoder 134 may further include a third determination circuit 140 configured to determine an encoded information based on the subset information for the plurality of frames. The first determination circuit 136, the second determination circuit 138, and the third determination circuit 140 may be coupled with each other, like indicated by lines 142, for example electrically coupled, for example using a line or a cable, and/or mechanically coupled.

According to various embodiments, the array of picture elements may include or may be backlit keys of a keyboard. According to various embodiments, the picture elements may be pixels on a display, for example a computer monitor or a laptop monitor, or a cinema screen, or an advertisement screen.

According to various embodiments, each picture element may encode a predetermined number of bits by a color of the picture element.

According to various embodiments, the information may correspond to at least one of a coupon, an award or registration information.

According to various embodiments, the indicator of each frame may be based on picture elements at predetermined positions of the array.

Figure 2:
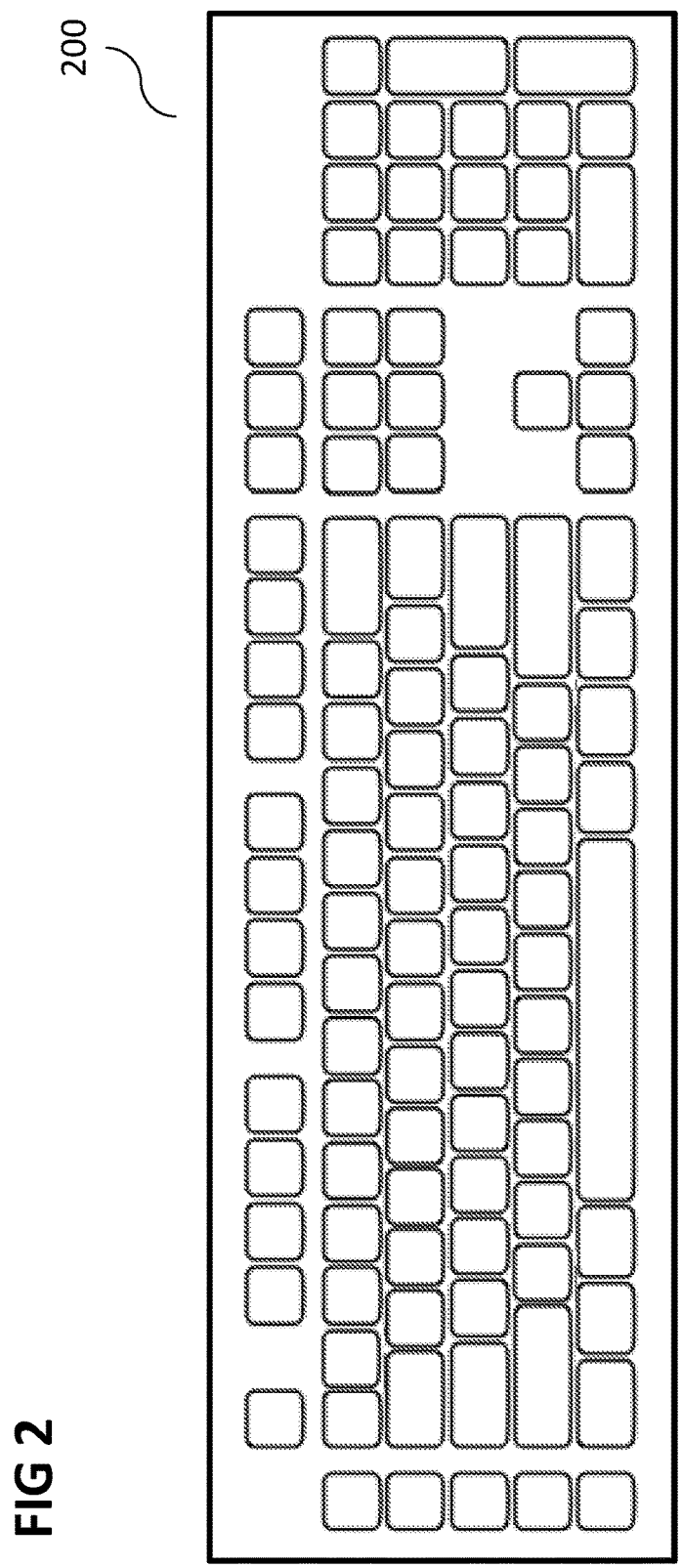
FIG. 2 shows a keyboard according to various embodiments.

FIG. 2 shows a keyboard 200, for example a Chroma keyboard, according to various embodiments.

A keyboard according to various embodiments may have 90 to 128 keys. For example, newer models of Razer Chroma keyboards have an LED, which allows each key's background to illuminate to almost any color based on a red LED, green LED or blue LED.

According to various embodiments, the background on each key may display information depending on the color of the LED that is being used. The number of bits per key may be the following:

| Color | Bit information |
|-------|-----------------|
| Black | 00 |
| Red   | 01 |
| Green | 10 |
| Blue  | 11 |

Given that there are for different bits of information which may be used for each key, with 90 keys, a total of about 22 bytes of data may be encoded. A camera app may take a picture of the keyboard, look at the color produced, and decode the 22 bytes. In other words, with the above table, 2 bits may be encoded per key, so that with 90 keys, a total of 180 bits, i.e. about 22 bytes may be encoded (per frame) in a keyboard with 90 keys. Likewise, for example with a keyboard with 128 keys, a total of 32 bytes of data may be encoded (per frame).

According to various embodiments, the information displayed may be the serial number of the devices (for example of the keyboard, or of any other hardware connected to the computer to which also the keyboard is connected), or any other info which is desired to be displayed.

According to various embodiments, the information may be used for coupons, or other mechanism to encourage users to buy products, for example keyboards, and to download apps. Since the keyboard may have to be removed from the box, and attached to a computer, and may require software to decode the data, there may be sufficient proof that the user has bought a device and is using the software for a reward.

According to various embodiments, information may be encoded similar to bar codes or QR codes.

According to various embodiments, a multiple color code representation may be provided.

According to various embodiments, multiple frames may be used to encode the information. For example, if there is a multi-frame gif image, or a batch of LEDs that can change color over time, the amount of information being represented may be increased.

Figure 3:
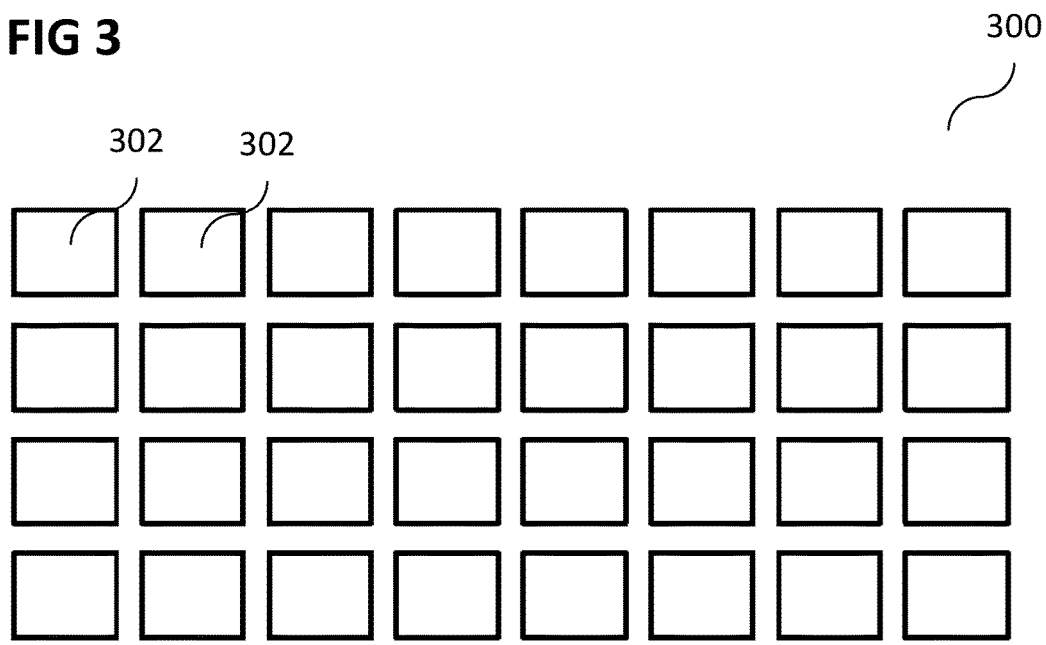
FIG. 3 and FIG. 4 show illustrations of a grid according to various embodiments.

FIG. 3 shows an illustration 300 of a grid (in other words: array) of 8 by 4 boxes or LEDs for illustration (wherein merely for illustration purposes in FIG. 3, the first two boxes are referenced by 302) according to various embodiments.

If each box is colored of data using red, green, blue or black, 2 bits of information may be encoded. In the grid shown in FIG. 3, this may represent 64 bits of data, or 8 bytes. The color of the boxes/LEDs may be changed over a time period to increase the amount of data being represented, but it may be desired to provide information on when in the sequence the data begins and ends in order to decode the data.

Figure 4:
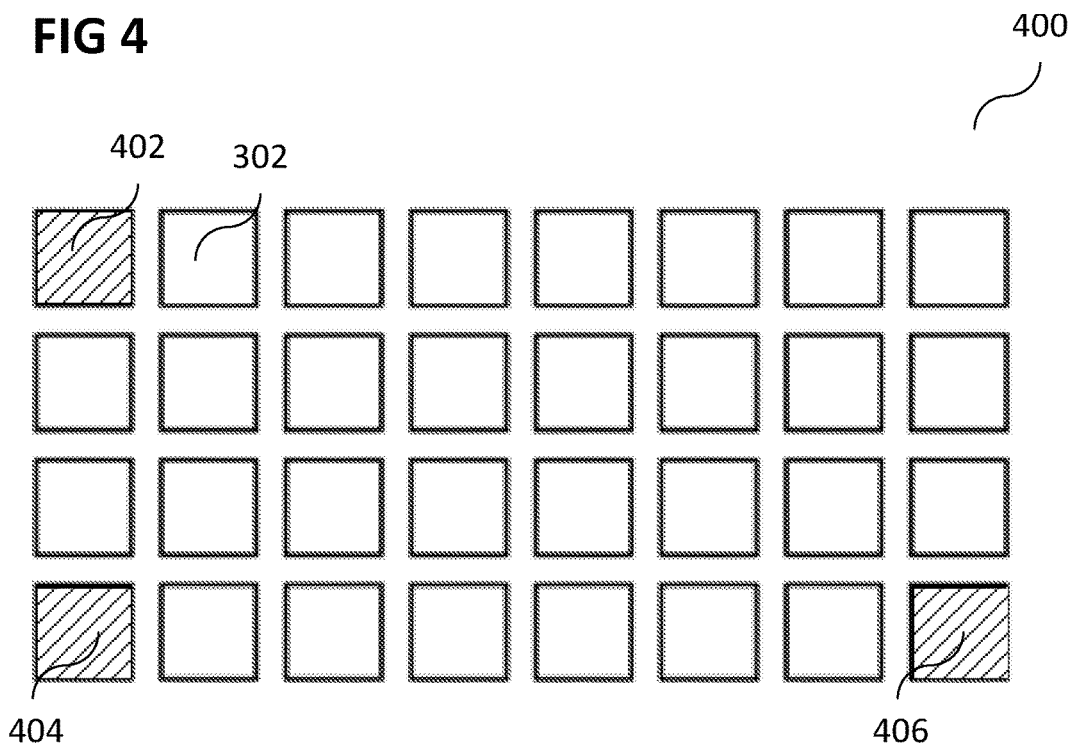

According to various embodiments, three corner boxes/LEDS (for example 402, 404, and 406 like shown in the illustration 400 of FIG. 4) may be used for the purpose to describe the frame, so that more data may be represented.

According to various embodiments, the color in each corner may be used for a dual purpose. One purpose may be to indicate the sequence in the data is currently being displayed (in other words: which a user is currently viewing), and a further purpose may be to act as anchor points for image process routines to identify the edges of the color codes so that the image may be oriented and processed to decode the data.

For example, the left top corner key (corresponding to 402 in FIG. 4) may be the be "1" key, the bottom left key (corresponding to 404 in FIG. 4) may be the "z" key, and the bottom right key (corresponding to 406 in FIG. 4) may be the "/" key.

According to various embodiments, there may be four colors (red, green, blue and black), so that the combinations of possible sets may be:

(R, R, R), (G, R, R), (G, G, R), (G, G, G), . . . , (B, B, B).

Each box/LED may be one of four colors. Multiplying each box/LEDs color possibilities, 4*4*4, and this may specify that 64 different sets or frames of data may be described.

Since three boxes/LEDS are removed from actual information encoding (because they are used as the corner boxes/LEDs), only 58 bits or about 7 bytes may be encoded per frame. If there are 64 frames, that means that 448 bytes of data may be encoded.

It will be understood that although the above description is for four colors, any number of colors (for example increased compared to four colors) may be provided. The method described above may assume using the maximum Red, Green, Blue or Black (not currently being lit) brightness. Adding mixing of the colors to the LEDS when displaying the image, the number of bits each box/LEDS represents may be increased. Adding these new colors may add an additional bit to each box/LED representation, for example as follows:

| Color | Bit Information (R, G, B) |
|-------|---------------------------|
| Black | 000 |
| Blue | 001 |
| Green | 010 |
| Cyan | 011 |
| Red | 100 |
| Purple | 101 |
| Yellow | 110 |
| White | 111 |

This above encoding may provide 8 possible different values to be represented by each LED. Thus, for example with a keyboard with 90 keys, a total of 270 bits (which corresponds to about 33 bytes) of data may be encoded.

In the following, it will be described how methods according to various embodiments may be used using a keyboard.

According to various embodiments, a keyboard (for example the Chroma keyboard) may have a separate tri-color LED for each key.

According to various embodiments, the entire keyboard keys (in other words: all keys of the keyboard) may be used to represent information. According to various embodiments, only a portion of the keys of the keyboards, where the keys are fairly evenly sized, may be used for processing. This group of keys may be centered on the alpha keys and may be common to all localized versions of the keyboard (for example keys "1" to "0", key "q" and the following 9 keys, key "a" and the following 9 keys, and key "z" (or "y", depending on the localization of the keyboard) and the following 9 keys).

Figure 5:
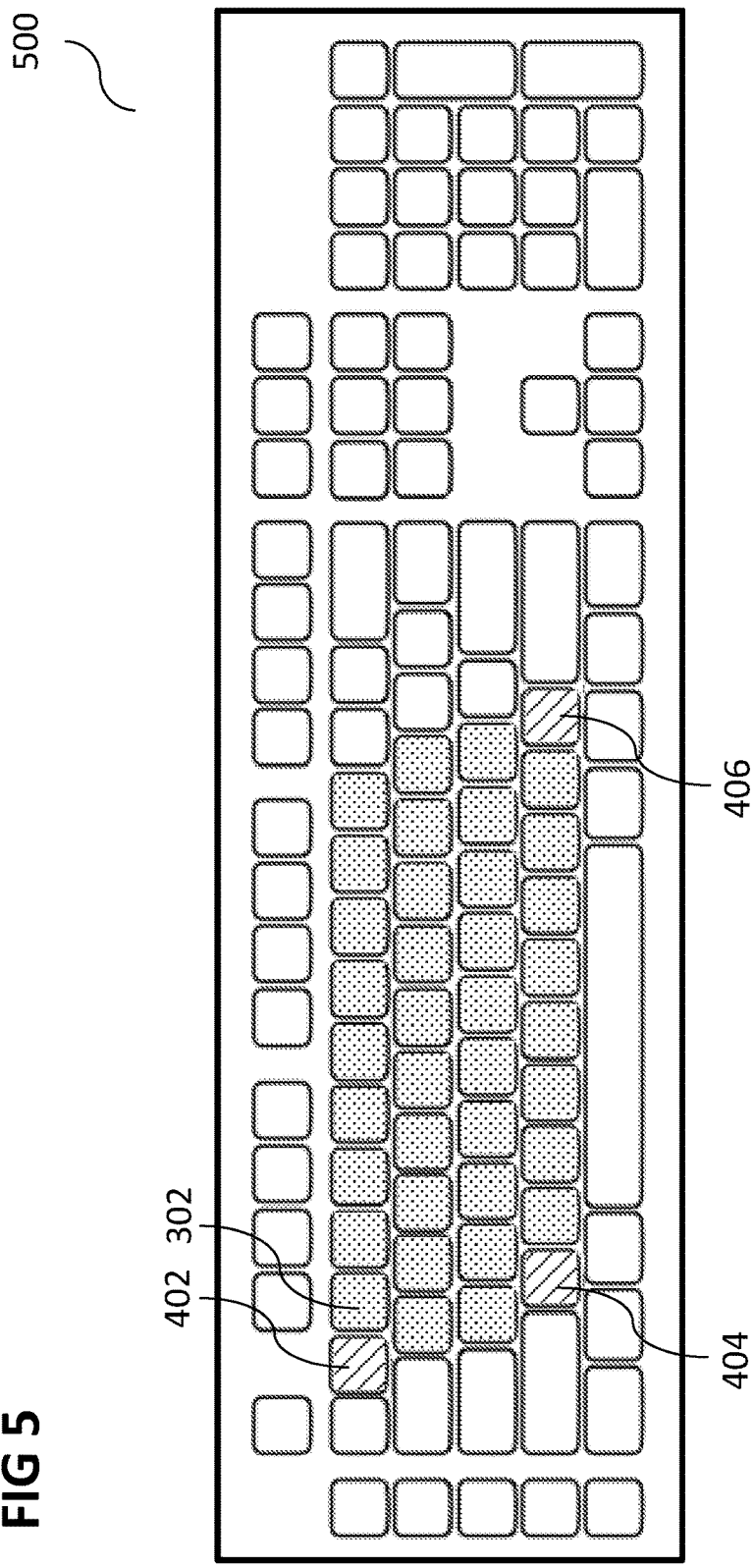
FIG. 5 and FIG. 6 show illustrations of a keyboard according to various embodiments.

FIG. 5 shows an illustration of a keyboard 500 with the array of keys as shown in FIG. 3 and FIG. 4 marked as dotted keys, and illustrating the three corner boxes/LEDS (for example 402, 404, and 406 (in other words: the three reference keys 402, 404, and 406) of FIG. 4.

This may represent a grid 10 by 4 with 3 bits of encoding per key, which may allow a single frame to encode ((10*4)−3)*3) or 111 bits of data or 37 octal nibbles.

Figure 6:
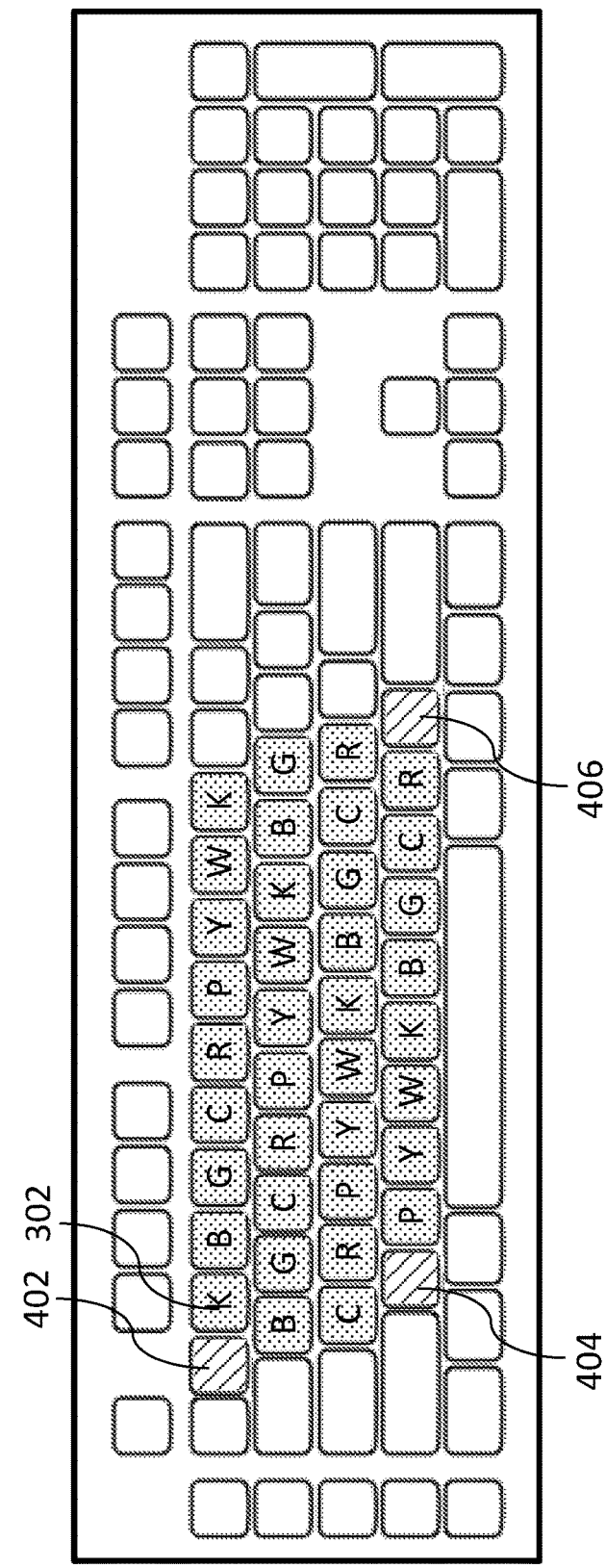

FIG. 6 shows an illustration 600 of the keyboard shown in FIG. 5, which represents a grid 10 by 4 with 3 bits of encoding per key, which allows a single frame to encode ((10*4)−3)*3) or 111 bits of data or 37 octal nibbles (of three bits each). An encoding in octal of the sequence 0, 1, 2, 3, 4, 5, 6, 7, 0, 1, 2, 3, 4, 5, 6, 7, 0, 1, 2, 3, 4, 5, 6, 7, 0, 1, 2, 3, 4, 5, 6, 7, 0, 1, 2, 3, and 4 is illustrated, wherein K in FIG. 6 represents black keys, and the other letters in the keys represent keys illuminated by a color according to the above table, wherein the first letter of the respective color is used in FIG. 6 for sake of brevity.

According to various embodiments, some of octets may be reserved for a CRC (cyclic redundancy check) calculation and frame count.

According to various embodiments, image processing may be provided by an App (application) on a device with a camera.

According to various embodiments, for keyboards (for example the Chroma keyboards), there may be two methods to read the LED values on the keyboard. The first method may be face centric, the second may be edge centric.

In a face centric system, the corner keys/anchor keys may be used to position the keyboard to read the values. Once the corner keys are identified, their relative distance may be used to determine the spacing between each key in the image. For keyboards, the size of each key may be known and it may simply be looked for the proper color in the image.

These image-processing routines may involve taking the image and performing segmentation. Segmentation may identify edges in the image. Once individual keys are identified, then looking at the color at predetermined location of the keys may be done to read its value.

In an edge centric representation, the keyboard edges may be used to read the LED values. This might include looking at the image segmentation results, and examine their colors directly. The noise of the led value of the key next to it may make this processing actually more complex, so that face centric processing may be used to eliminate the noise.

According to various embodiments, a device with a camera may have an application that records a single image, or a video (multiple images) to recover the data. It may perform the described image processing across multiple images and may use the corner keys to determine the proper order of the data being represented.

According to various embodiments, an application may add cyclic redundancy check (CRC) to ensure that the data has been interpreted correctly and potentially correct for errors.

According to various embodiments, three more keys may be used and illuminated with red, green and blue respectably. This may be done by assigning three keys to always have these colors, or have a frame reference that illuminates a predetermined pattern of red, green, and blue so an application's image process routines can calibrate for the light conditions of the image or video.

With a camera app according to various embodiments, values of a manufactured keyboard may be read. In manufacturing it may be ensured that the LED are functioning properly and can be display at the proper intensity. When a group of data has been encoded, representing values to illuminate every combination of LEDS, those the data collected for a proper installation may be matched. If the data read matches, then it may be known that the LEDS are installed correctly.

According to various embodiments, 3 keys, one on each edge of the keyboard, may be used for orientation.

According to various embodiments, more data may be encoded, if video is used, and the anchor keys' color is altered to indicate data sequence. This may increase the data to be displayed by a factor of 6. So 270-612 bytes of data may be encoded and displayed.

The following examples pertain to further embodiments.

Example 1 is an information encoding method comprising: receiving information to be encoded; splitting the information into a plurality of subsets; assigning each subset to a frame, so as to determine a plurality of frames; for each subset assigning the subset to a plurality of colors; and sequentially, for each frame of the plurality of frames, displaying the colors assigned for the respective frame and an indicator for the frame on an array of picture elements.

In example 2, the subject-matter of example 1 can optionally include that the array of picture elements comprises backlit keys of a keyboard.

In example 3, the subject-matter of any one of examples 1 to 2 can optionally include that each picture element encodes a predetermined number of bits by a color of the picture element.

In example 4, the subject-matter of any one of examples 1 to 3 can optionally include that the information corresponds to at least one of a coupon, an award or registration information.

In example 5, the subject-matter of any one of examples 1 to 4 can optionally include that the indicator of each frame is based on picture elements at predetermined positions of the array.

Example 6 is an information decoding method comprising: determining for each picture element of an array of picture elements a color, so as to determine a plurality of colors; sequentially, for a plurality of frames, determining from the plurality of colors an indicator for the frame and a subset information encoded in the frame based on the plurality of colors; and determining an encoded information based on the subset information for the plurality of frames.

In example 7, the subject-matter of example 6 can optionally include that the array of picture elements comprises backlit keys of a keyboard.

In example 8, the subject-matter of any one of examples 6 to 7 can optionally include that each picture element encodes a predetermined number of bits by a color of the picture element.

In example 9, the subject-matter of any one of examples 6 to 8 can optionally include that the information corresponds to at least one of a coupon, an award or registration information.

In example 10, the subject-matter of any one of examples 6 to 9 can optionally include that the indicator of each frame is based on picture elements at predetermined positions of the array.

Example 11 is a computer-readable medium comprising instructions which, when executed by a computer, make the computer perform an information encoding method, the information encoding method comprising: receiving information to be encoded; splitting the information into a plurality of subsets; assigning each subset to a frame, so as to determine a plurality of frames; for each subset assigning the subset to a plurality of colors; and sequentially, for each frame of the plurality of frames, displaying the colors assigned for the respective frame and an indicator for the frame on an array of picture elements.

In example 12, the subject-matter of example 11 can optionally include that the array of picture elements comprises backlit keys of a keyboard.

In example 13, the subject-matter of any one of examples 11 to 12 can optionally include that each picture element encodes a predetermined number of bits by a color of the picture element.

In example 14, the subject-matter of any one of examples 11 to 13 can optionally include that the information corresponds to at least one of a coupon, an award or registration information.

In example 15, the subject-matter of any one of examples 11 to 14 can optionally include that the indicator of each frame is based on picture elements at predetermined positions of the array.

Example 16 is a computer-readable medium comprising instructions which, when executed by a computer, make the computer perform an information decoding method, the information decoding method comprising: determining for each picture element of an array of picture elements a color, so as to determine a plurality of colors; sequentially, for a plurality of frames, determining from the plurality of colors an indicator for the frame and a subset information encoded in the frame based on the plurality of colors; and determining an encoded information based on the subset information for the plurality of frames.

In example 17, the subject-matter of example 16 can optionally include that the array of picture elements comprises backlit keys of a keyboard.

In example 18, the subject-matter of any one of examples 16 to 17 can optionally include that each picture element encodes a predetermined number of bits by a color of the picture element.

In example 19, the subject-matter of any one of examples 16 to 18 can optionally include that the information corresponds to at least one of a coupon, an award or registration information.

In example 20, the subject-matter of any one of examples 16 to 19 can optionally include that the indicator of each frame is based on picture elements at predetermined positions of the array.

Example 21 is an information encoder comprising: a receiver configured to receive information to be encoded; a splitting circuit configured to split the information into a plurality of subsets; a first assigning circuit configured to assign each subset to a frame, so as to determine a plurality of frames; a second assigning circuit configured to, for each subset, assign the subset to a plurality of colors; and a display circuit configured to, sequentially, for each frame of the plurality of frames, display the colors assigned for the respective frame and an indicator for the frame on an array of picture elements.

In example 22, the subject-matter of example 21 can optionally include that the array of picture elements comprises backlit keys of a keyboard.

In example 23, the subject-matter of any one of examples 21 to 22 can optionally include that each picture element encodes a predetermined number of bits by a color of the picture element.

In example 24, the subject-matter of any one of examples 21 to 23 can optionally include that the information corresponds to at least one of a coupon, an award or registration information.

In example 25, the subject-matter of any one of examples 21 to 24 can optionally include that the indicator of each frame is based on picture elements at predetermined positions of the array.

Example 26 is an information decoder comprising: a first determination circuit configured to determine for each picture element of an array of picture elements a color, so as to determine a plurality of colors; a second determination circuit configured to determine sequentially, for a plurality of frames, from the plurality of colors an indicator for the frame and a subset information encoded in the frame based on the plurality of colors; and a third determination circuit configured to determine an encoded information based on the subset information for the plurality of frames.

In example 27, the subject-matter of example 26 can optionally include that the array of picture elements comprises backlit keys of a keyboard.

In example 28, the subject-matter of any one of examples 26 to 27 can optionally include that each picture element encodes a predetermined number of bits by a color of the picture element.

In example 29, the subject-matter of any one of examples 26 to 28 can optionally include that the information corresponds to at least one of a coupon, an award or registration information.

In example 30, the subject-matter of any one of examples 26 to 29 can optionally include that the indicator of each frame is based on picture elements at predetermined positions of the array.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An information decoding method comprising:
receiving a video comprising a plurality of frames, each frame comprising an image of a keyboard comprising backlit keys;
sequentially, for each frame,
identifying corner backlit keys of the keyboard in the image;
determining spacing of each backlit key in the image based on relative distance of the corner backlit keys;
determining for each backlit key a color, so as to determine a plurality of colors; and determining from the plurality of colors an indicator for the frame and a subset information encoded in the frame based on the plurality of colors; and determining an encoded information based on the subset information for the plurality of frames.

2. The information decoding method of claim 1, wherein each backlit key encodes a predetermined number of bits by a color of the backlit key.

3. The information decoding method of claim 1, wherein the encoded information corresponds to at least one of a coupon, an award or registration information.

4. The information decoding method of claim 1, wherein the indicator of each frame is based on backlit keys at predetermined positions of the keyboard.

5. A non-transitory computer-readable medium comprising instructions which, when executed by a computer, make the computer perform an information decoding method, the information decoding method comprising:

receiving a video comprising a plurality of frames, each frame comprising an image of a keyboard comprising backlit keys;

sequentially, for each frame,
identifying corner backlit keys of the keyboard in the image;
determining spacing of each backlit key in the image based on relative distance of the corner backlit keys;
determining for each backlit key a color, so as to determine a plurality of colors; and
determining from the plurality of colors an indicator for the frame and a subset information encoded in the frame based on the plurality of colors; and determining an encoded information based on the subset information for the plurality of frames.

6. The non-transitory computer-readable medium of claim 5, wherein each backlit key encodes a predetermined number of bits by a color of the backlit key.

7. The non-transitory computer-readable medium of claim 5, wherein the encoded information corresponds to at least one of a coupon, an award or registration information.

8. The non-transitory computer-readable medium of claim 5, wherein the indicator of each frame is based on backlit keys at predetermined positions of the keyboard.

9. An information decoder comprising:
a receiving circuit configured to receive a video comprising a plurality of frames, each frame comprising an image of a keyboard comprising backlit keys;
an identification circuit configured to identify corner backlit keys of the keyboard in the image;
a spacing determination circuit configured to determine spacing of each backlit key in the image based on relative distance of the corner backlit keys;
a first determination circuit configured to determine for each backlit key a color, so as to determine a plurality of colors;
a second determination circuit configured to determine sequentially, for the plurality of frames, from the plurality of colors an indicator for the frame and a subset information encoded in the frame based on the plurality of colors; and a third determination circuit configured to determine an encoded information based on the subset information for the plurality of frames.

10. The information decoder of claim 9, wherein each backlit key encodes a predetermined number of bits by a color of the backlit key.

11. The information decoder of claim 9, wherein the encoded information corresponds to at least one of a coupon, an award or registration information.

12. The information decoder of claim 9, wherein the indicator of each frame is based on backlit keys at predetermined positions of the keyboard.

13. The information decoding method of claim 1, wherein the encoded information is encoded by an information encoding method comprising:
receiving information to be encoded;
splitting the information into a plurality of subset information;
assigning each subset information to a frame, so as to determine the plurality of frames;
for each subset information assigning the subset information to respective plurality of colors; and
sequentially, for each frame of the plurality of frames, displaying the colors assigned for the respective frame and the indicator for the frame on the backlit keys.

14. The non-transitory computer-readable medium of claim 5, wherein the encoded information is encoded by an information encoding method comprising:
receiving information to be encoded;
splitting the information into a plurality of subset information;
assigning each subset information to a frame, so as to determine the plurality of frames;
for each subset information assigning the subset information to respective plurality of colors; and
sequentially, for each frame of the plurality of frames, displaying the colors assigned for the respective frame and an indicator for the frame on the backlit keys.

15. The information decoder of claim 9, wherein the encoded information is encoded by an information encoder comprising:
a receiver configured to receive information to be encoded;
a splitting circuit configured to split the information into a plurality of subset information;
a first assigning circuit configured to assign each subset information to a frame, so as to determine the plurality of frames;
a second assigning circuit configured to, for each subset information, assign the subset information to respective plurality of colors; and
a display circuit configured to, sequentially, for each frame of the plurality of frames, display the colors assigned for the respective frame and an indicator for the frame on the backlit keys.

16. The information decoder of claim 15, wherein each backlit key encodes a predetermined number of bits by a color of the backlit key.

* * * * *